(12) United States Patent (10) Patent No.: US 12,607,493 B2
Malinovskiy (45) Date of Patent: Apr. 21, 2026

(54) FILL-LEVEL MEASUREMENT USING A MACHINE LEARNING ALGORITHM

(71) Applicant: Endress+Hauser SE+Co. KG, Maulburg (DE)

(72) Inventor: Alexey Malinovskiy, Maulburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 267 days.

(21) Appl. No.: 18/569,415

(22) PCT Filed: May 19, 2022

(86) PCT No.: PCT/EP2022/063595
§ 371 (c)(1),
(2) Date: Dec. 12, 2023

(87) PCT Pub. No.: WO2022/263099
PCT Pub. Date: Dec. 22, 2022

(65) Prior Publication Data
US 2024/0271985 A1 Aug. 15, 2024

(30) Foreign Application Priority Data
Jun. 18, 2021 (DE) ...................... 10 2021 115 874.5

(51) Int. Cl.
*G01F 23/284* (2006.01)
(52) U.S. Cl.
CPC .................................. *G01F 23/284* (2013.01)
(58) Field of Classification Search
CPC ..................................................... G01F 23/284
See application file for complete search history.

(56) References Cited

U.S. PATENT DOCUMENTS 6,577,960 B1 * 6/2003 Rabelo .................. G01F 23/802
706/15
7,345,622 B2 * 3/2008 Edvardsson .......... G01S 7/4052
73/290 R
(Continued)

FOREIGN PATENT DOCUMENTS

DE 4223346 A1 1/1994
DE 102009055262 A1 6/2011
(Continued)

OTHER PUBLICATIONS

Borg, et al., Machine-learning classification of environmental conditions inside a tank by analyzing radar curves in industrial level measurements, Flow Measurement and Instrumentation 79 (2021) 101940, 9 pp.
(Continued)

*Primary Examiner* — Peter M Bythrow
(74) *Attorney, Agent, or Firm* — Mark A. Logan; Endress+Hauser (USA) Holding, Inc.

(57) ABSTRACT

A measuring system and a corresponding measuring method for reliably determining a fill level of a filling material in a container comprises a radar-based measuring device having a transmission unit via which high-frequency signals can be transmitted towards the filling material and received as received signals after reflection on the filling material surface; furthermore having a signal generation unit which generates the high-frequency signal to be transmitted; and having a receiving unit which records the received signal. In an evaluation unit of the measuring system, a machine learning algorithm is designed such that the fill level can be detected on the basis of the received signal. By the machine learning algorithm, received signals which are recorded under complex measuring conditions such as interference
(Continued)

and multiple reflections can be interpreted much more reliably.

9 Claims, 1 Drawing Sheet

(56) References Cited

U.S. PATENT DOCUMENTS

| | | | | |
|---|---|---|---|---|
| 10,044,094 | B2 * | 8/2018 | Fehrenbach | H04B 17/103 |
| 10,295,393 | B2 * | 5/2019 | Eriksson | G01F 23/284 |
| 11,029,188 | B2 * | 6/2021 | Waelde | G01S 7/35 |
| 2011/0145180 | A1 | 6/2011 | Muller | |
| 2012/0265486 | A1 * | 10/2012 | Klofer | G01F 23/80 |
| | | | | 702/166 |
| 2012/0299768 | A1 * | 11/2012 | Griessbaum | G01F 23/296 |
| | | | | 367/128 |
| 2013/0213132 | A1 * | 8/2013 | Wegemann | G01F 23/284 |
| | | | | 73/290 V |
| 2015/0338261 | A1 * | 11/2015 | Mueller | G01S 7/03 |
| | | | | 342/124 |
| 2016/0125720 | A1 | 5/2016 | Chattopadhyay | |
| 2017/0254692 | A1 * | 9/2017 | Faber | H01P 3/06 |
| 2018/0372530 | A1 * | 12/2018 | Welle | G01F 23/284 |
| 2019/0033116 | A1 * | 1/2019 | Hoferer | G01F 25/20 |
| 2019/0107426 | A1 * | 4/2019 | Welle | G01S 13/88 |
| 2021/0262848 | A1 * | 8/2021 | Hoferer | G01F 23/284 |
| 2021/0356312 | A1 * | 11/2021 | Wegner | H01Q 1/40 |
| 2023/0048720 | A1 * | 2/2023 | Luxford | G01S 7/027 |
| 2023/0273060 | A1 * | 8/2023 | Welle | G01F 23/804 |
| | | | | 73/290 R |

FOREIGN PATENT DOCUMENTS

| | | |
|---|---|---|
| DE | 102018212097 A1 | 1/2020 |
| DE | 102018124606 A1 | 4/2020 |
| DE | 102018128254 A | 5/2020 |

OTHER PUBLICATIONS

Borg, et al., Neural networks as a diagnosing tool for industrial level measurement through non-contacting radar type and support to the decision for its better application, ScienceDirect, IFAC—PapersOnLine 49-30 (2016), www.sciencedirect.com, 349-354, 6 pp.

* cited by examiner

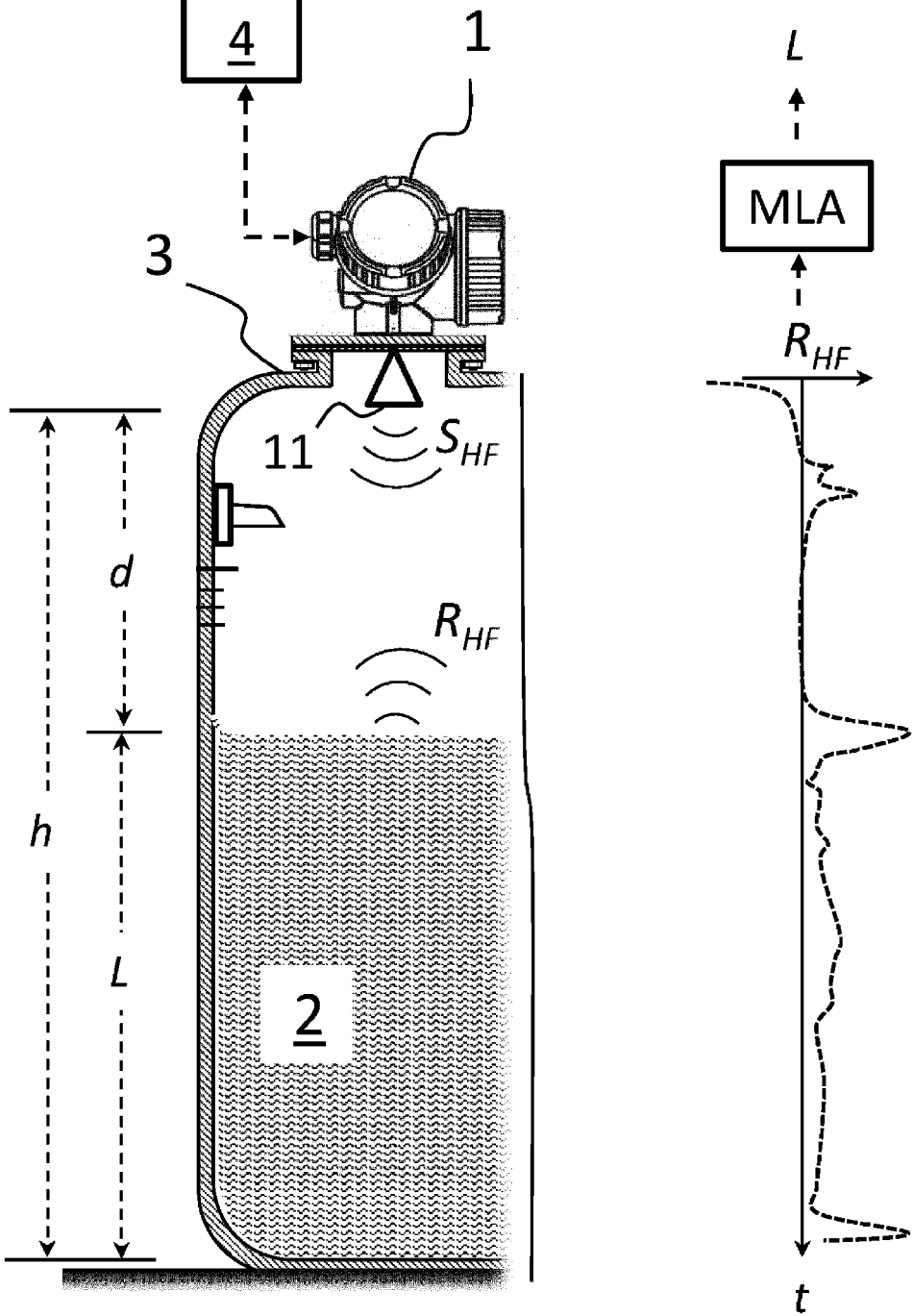

FILL-LEVEL MEASUREMENT USING A MACHINE LEARNING ALGORITHM

CROSS-REFERENCE TO RELATED APPLICATIONS

The present application is related to and claims the priority benefit of DPMA Patent Application No. 10 2021 115 874.5, filed on Jun. 18, 2021, and International Patent Application No. PCT/EP2022/063595, filed May 19, 2022, the entire contents of which are incorporated herein by reference.

TECHNICAL FIELD

The invention relates to radar-based measurement of a fill level on the basis of machine learning algorithms.

BACKGROUND

In automation technology, in particular for process automation, field devices by means of which various process variables can be detected are often used. The process variable to be specified can, for example, be a fill level, a flow, a pressure, the temperature, the pH value, the redox potential, a conductivity, or the dielectric value of a medium in a process plant. In order to detect the corresponding measured values, the field devices each comprise suitable sensors or are based upon suitable measuring principles. A variety of various types of field devices are manufactured and marketed by the Endress+Hauser group of companies.

For measuring the fill level of filling materials in containers, radar-based measuring methods have become established, since they are robust and low-maintenance. A key advantage of radar-based measuring methods is their ability to measure the fill level more or less continuously and without contact. In the context of this patent application, the terms, "radar" and "high-frequency," refer to electromagnetic waves with frequencies between 0.03 GHz and 300 GHz. Typical frequency bands at which fill-level measurement is performed are at 2 GHZ, 26 GHZ, 79 GHZ, or 120 GHz. The two common measurement principles here are the pulse transit time principle (also known by the term, "pulse radar") and the FMCW ("frequency-modulated continuous wave") principle. On the basis of the pulse transit time method and on the basis of the FMCW method, fill-level measurement devices can be implemented with comparatively low circuitry complexity and a high fill-level resolution in the sub-millimeter range.

SUMMARY

In addition to freely-radiating radar measurement, in which the high-frequency signals are emitted or received via an antenna, the variant of guided radar also exists. In this case, instead of the antenna, an electrically-conductive measuring sensor (for example, a coaxial waveguide or a metal rod) is used, which is lowered into the container in order to guide the high-frequency signals. Similarly to freely-radiating radar, the high-frequency signal in the measuring sensor is reflected at the fill level of the filling material surface and guided back along the measuring sensor towards the fill-level measuring device. This variant of radar-based, fill-level measurement is also known by the term, "TDR" (time-domain reflectometry). This variant is advantageous in that, due to the guided signal radiation, less power is required for operating the fill-level measurement device. A TDR-based fill-level measuring device is described, for example, in US patent specification 10,07,743 B2.

Independently of the measuring principle (pulse transit time, FMCW, or TDR), the fill-level value is specified by determining from the reflected received signal the signal maximum resulting from the filling material surface and its corresponding distance value. In general, the various radar-based measurement principles are described, for example, in "Radar Level Detection," Peter Devine, 2000.

Depending upon the type of product whose level is to be specified, the product can be pervaded with impurities, additives, or foreign substances, which can form an additive product layer above or below the product, such as a foam, a sediment, or an oily or aqueous phase. In this case, a more or less pronounced boundary layer, often also understood as a "separating layer," is also formed between the actual product and the additive product layer. Accordingly, the fill-level measurement can be disturbed or falsified by possible additional filling material layers or by multiple reflections, since the corresponding signal maximum of the filling material surface cannot be identified with certainty. This can also occur if there are interfering objects such as agitators or supply lines in the tank which generate corresponding interference echoes after the high-frequency signal is transmitted.

If necessary, in addition to the fill level, it is also of interest to be able to reliably detect the presence or even the thickness of any additive filling material layer. A TDR-based fill-level measuring device that determines a possible additive filling material layer by comparing the signal amplitude of a signal maximum with a theoretical target value is described in European patent application 2 722 655 A1. However, even in this case, detection by means of identification of the corresponding signal maximum is at least uncertain, since the additive product layer or its surface may reflect the corresponding signal only very weakly.

The object of the invention is therefore to achieve reliable fill-level measurement.

The invention achieves this object by a measuring system for measuring a fill level of a filling material in a container, comprising the following components:

a radar-based measuring device, having
a transmission unit, by means of which high-frequency signals can be transmitted towards the filling material and can be received as received signals after reflection at the filling material surface,
a signal generation unit that is designed to generate the high-frequency signal to be transmitted,
a receiving unit that is designed to record the received signal, and
an evaluation unit in which, according to the invention, a machine learning algorithm is designed such that the fill level is detected on the basis of the received signal.

In the context of the invention, the term, "unit," in principle refers to any electronic circuit that is designed in a manner suitable for the intended purpose. Depending upon the requirement, it can therefore be an analog circuit for generating or processing corresponding analog signals. However, it can also be a digital circuit such as a microcontroller or a storage medium operating in conjunction with a program. The program is designed to carry out the corresponding method steps or to apply the necessary computing operations for the respective unit. In this context, various electronic units of the measuring system in the sense of the invention can potentially also access a common physical memory or be operated physically by means of the same digital circuit.

The implementation of a machine learning algorithm according to the invention avoids the problem that the correct signal maximum in the received signal may not be assigned to the filling material surface, as is required for its detection according to the prior art. In fact, the machine learning algorithm can be used to interpret with much greater certainty in particular received signals that are recorded under complex measurement conditions, such as multiple reflections or when there are internal container fittings.

In the context of the invention, a "machine learning algorithm" is defined in principle as any universal mathematical function approximator that maps at least one of its input variables to at least one of its output variables. Internal parameters of the corresponding mapping functions are adjusted during a teaching phase based upon known training data. In this case, in particular, supervised learning is implemented as an algorithmic approach. In this connection, the specific form in which the machine learning algorithm is implemented is not firmly prescribed in the context of the invention. For example, the machine learning algorithm can be implemented in the form of "decision trees," a "support vector machine," "naive Bayes," or "k-nearest neighbor." However, the fill level can be detected particularly effectively if the machine learning algorithm is designed on the basis of a non-symbolic approach, such as an artificial neural network, in particular in the form of a deep learning method (better known as "deep learning"). Machine learning algorithms are described in more detail, for example, in "Introduction to Artificial Intelligence" (Wolfgang Ertel, 2017).

Furthermore, how or where the evaluation unit is implemented is not essential in the context of the invention. For example, the evaluation unit can be designed as an integral component of the measuring device, or even as a component of a higher-level network, such as a cloud or server, or as a component of a plant-specific process control system.

The idea according to the invention can be used, for example, if the level measuring device is designed on the basis of the TDR method so that the transmission unit is realized as a measuring probe that extends into the container. Corresponding to this, the signal generation unit generates the high-frequency signal to be transmitted in this case according to the TDR method in a correspondingly pulse-wise manner. An advantage of the TDR method with respect to the idea according to the invention is that the received signal has an overall higher signal amplitude, which in principle makes it easier for the machine learning algorithm to identify the fill level.

However, it is possible to also use the idea according to the invention in principle in the case of a freely-radiating radar measuring device, in which the transmission unit is designed as an antenna, depending upon the frequency band—for example, as a horn antenna, a lens antenna, or as a planar antenna. It is not important here whether the signal generation unit generates the to-be-transmitted high-frequency signal according to the FMCW method or the receiving unit records the received signal according to the FMCW method, or whether the signal generation unit generates the to-be-transmitted high-frequency signal according to the pulse transit time method, and the receiving unit records the received signal according to the pulse transit time method.

Corresponding to the measuring system according to the invention, the object underlying the invention is further achieved by a corresponding measuring method for detecting the fill level of a filling material in a container by means of the measuring system according to one of the embodiment variants described above. In this case, the method comprises the following method steps:

transmitting a high-frequency signal via the transmission unit into the container according to the particular radar method, recording the received signal after reflection of the high-frequency signal according to the corresponding radar method, and evaluating the received signal by means of the machine learning algorithm in such a way that the fill-level layer is detected.

The machine learning algorithm can be trained in the teaching phase, which is required before the actual measurement operation, e.g., by means of experimentally-obtained and/or simulation-generated received signals, such as by means of "CST Microwave Studio."

Optionally, the method according to the invention can be extended by the following method steps in order, for example, to check the operability of the measuring device:

determining a fill-level value by locating a signal maximum corresponding to the filling material surface in the received signal according to the classical evaluation, comparing the fill-level value, which is determined according to the prior art by locating the corresponding signal maximum, with the fill level which is determined according to the invention by means of the machine learning algorithm, and classifying the determined fill level as plausible provided that the comparison results in a sufficient match.

This can further increase the certainty and significance of the fill-level measurement.

BRIEF DESCRIPTION OF THE DRAWINGS

The present disclosure is explained in more detail with reference to the following FIGURE. It shows:

FIG. 1 shows a measuring system according to the present disclosure for measuring the fill level in a container.

DETAILED DESCRIPTION

To understand the measurement of the fill level according to the invention, FIG. 1 shows a freely-radiating radar measuring device 1 which can be used to determine the fill level L of a filling material 2 in a container 3. To implement the pulse transit time or FMCW method, the measuring device 1 comprises an antenna 11 as a transmission unit for corresponding high-frequency signals $S_{HF}$, $R_{HF}$ in the direction of the filling material 2 or after reflection in the container 3. Contrary to the embodiment variant shown in FIG. 1, in the case of the TDR measuring principle, a measuring probe is required as a transmission unit 11 instead of the antenna 11.

In order to determine the fill level L, the measuring device 1 is attached to the upper side of the container 3, wherein the antenna 11 for transmitting and receiving the high-frequency signals $S_{RF}$, $R_{RF}$ in the container interior is directed towards the filling material 2. In this case, the installation height h of the measuring device 1 above the container bottom is known and stored in the fill-level measuring device 1 or in an external evaluation unit 4, such as a decentralized server or a central process control system.

The high-frequency signal $S_{HF}$ to be transmitted is transmitted via the antenna 11 in a pulsed or frequency-modulated manner in the direction of the filling material 2 in accordance with the FMCW or pulse transit time method. Due to the jump in the dielectric value on the surface of the filling material 2, the transmitted high-frequency signal $S_{HF}$ is then reflected at the level of the filling material surface and received accordingly after a corresponding signal transit time t in the measuring device 1 as the received signal $R_{HF}$. In this case, the signal transit time t of the signal $S_{HF}$, $R_{HF}$ according to $$t = \frac{2d}{c}$$

depends upon the distance d $$d = h - L$$

from the container top to the filling material surface. In this case, c is the propagation speed of the high-frequency signal $S_{HF}$, $R_{HF}$ in the container 3, which lies in the range of the speed of light c. To generate the high-frequency signal $S_{HF}$, the fill-level measuring device 1 comprises a correspondingly designed signal generation unit—in the case of the TDR method, for example, this can be based upon a capacitor that is correspondingly discharged to generate the pulse lasting approximately 100 ps to 1 ns. In the case of freely-radiating radar according to the pulse transit time method or FMCW method, as is the case in FIG. 1, the signal generation unit can comprise, for example, a frequency-controlled high-frequency oscillating circuit or an oscillating crystal. In order for the signal generation unit to generate the high-frequency signal $S_{HF}$ according to the respective method at the required clock rate in pulse or ramp form, the capacitor or the crystal oscillator is driven in a correspondingly clocked or modulated manner.

Between the signal generation unit of the measuring device 1 and the antenna 11, a transceiver switch is interposed in order to feed the received signal $R_{HF}$, after reflection in the container 3, to a receiving unit, in which the received signal $R_{HF}$ is digitized or recorded (not explicitly depicted). In this case, the design of the transceiver switch is, in principle, not firmly specified. In the case of the TDR method, as is the case in the embodiment variant shown in FIG. 1, the transceiver switch can be designed, for example, as a purely electrical node. Particularly in the case of freely-radiating radar, the transceiver switch can be implemented as, for example, a duplexer.

To determine the fill level L, the received signal $R_{HF}$ can be recorded in the receiving unit, for example, by undersampling the received signal $R_{HF}$ according to the pulse transit time principle such that the received signal $R_{HF}$ is stretched in time by a defined factor. In this case, the time prolongation factor depends upon the sampling rate. For this purpose, the corresponding sampling rate must be selected to achieve sufficient time prolongation, such that it differs from the clock rate of the emitted signal pulses $S_{HF}$ only in the per mile range. In the case of FMCW, the time-prolonged recording of the received signal $R_{HF}$ is achieved by mixing the received signal $R_{HF}$ with the instantaneously transmitted high-frequency signal $S_{HF}$.

The time prolongation simplifies, from a circuitry perspective, the determination of the fill level L on the basis of the received signal $R_{HF}$. In the embodiment of the measuring device 1 shown in FIG. 1, in the case of freely-radiating radar, the received signal $R_{HF}$ is rectified in addition to the time prolongation, such that the recorded received signal $R_{HF}$ has only one polarity—plus or minus—with respect to a fixed reference potential.

The determination of the fill level L by means of the possibly time-prolonged received signal $R_{HF}$ is illustrated in more detail by the curve shown on the right in FIG. 1: The curve there illustrates the time amplitude curve of the received signal $R_{HF}$. In this case, the distance d between the container top and the filling material surface is proportional to the signal transit time axis t of the curve shown in FIG. 1. In the ideal case, i.e., without any external interference, the received signal $R_{HF}$ comprises at least one significant signal maximum which can be clearly assigned to the surface of the filling material 2. In this case, the fill level L is specified on the basis of the transit time t corresponding to the signal maximum and the previously mentioned formulas. According to the prior art, this can be done by means of corresponding search algorithms for detecting the signal maximum in the evaluation signal $R_{HF}$.

As can be seen from the curve shown in FIG. 1, the evaluation signal $R_{HF}$ includes other signal maxima, in addition to the maximum fill level, which can be assigned to the reflection of the high-frequency signal $S_{HF}$ on the container base or interfering bodies such as inlets, for example. Depending upon the place of use, the signal maxima also do not have a sharp profile. This means that, in case of doubt, it is not possible to determine any or the correct signal maximum from this. Therefore, regardless of whether it is based upon the pulse transit time, the FMCW, or the TDR measuring principle, it is not possible for the measuring device 1 to determine the fill level L of the filling material 2 correctly with certainty, depending upon the measuring situation. Depending upon the application or process system, it is essential to know the fill level L of the filling material 2 with certainty, e.g., to prevent overfilling of the container 3.

According to the invention, the fill level L can be determined by applying a machine learning algorithm MLA to the possibly time-prolonged received signal $R_{HF}$, even if the signal maxima cannot be detected beyond doubt. In this case, which learning algorithm MLA is applied is not specified in principle. However, artificial neural networks, and in particular "deep learning," are proving to be particularly effective in this regard. As a result, the received signal $R_{HF}$ can be interpreted more reliably with regard to the fill level L in the case of a more complex signal curve than if only signal maxima are detected and used to determine the fill level.

Since the application of the machine learning algorithm MLA may require a high computing power, it is advantageous if the machine learning algorithm MLA is not implemented in the measuring device 1 itself, but in the external evaluation unit 4, since the measuring device 1 may be subject under certain circumstances to a limited power supply in the process plant. In this case, the measuring device 1 or its receiving unit can transmit the recorded received signal $R_{HF}$ to the evaluation unit 4 via a suitable interface, such as "PROFIBUS," "HART," "Wireless HART," "4-20 mA," "Bluetooth," or "Ethernet." The evaluation unit 4 together with the measuring device 1 thus forms a corresponding measuring system for measuring the fill level in the container 3 according to the invention. Provided that sufficient computing power is also available in the measuring device 1, the machine learning algorithm can also be implemented in the measuring device 1 itself.

The application of machine learning algorithms MLA requires training the measuring system according to the invention under known conditions. For this reason, prior to regular measuring operation, the measuring device 1 is to be exposed to various training situations with known parameters, such as the fill level L of the product 2, a known filling material type or its dielectric value DK, and/or a known inner container geometry.

The received signals $R_{HF}$ upon which the learning phase is based can be obtained not only experimentally, but also by means of simulation, such as by "CST Microwave Studio." This avoids a time-consuming training phase in the process plant.

Based upon the invention, it is not only possible to determine the fill level L, but the fill level L can also be checked for its plausibility—for example, in order to validate the functionality of the measuring device 1 and therefore further increase the reliability of the measurement. For this purpose, the evaluation unit 4 can be designed in such a way that it determines the fill-level value L from the received signal $R_{HF}$ not only by means of the automatic algorithm MLA, but also by localizing the corresponding signal maximum, as may be possible according to the state of the art. In this case, the two level values L determined in different ways (using the method according to the invention and using the conventional method) can be compared with each other: If the comparison results in sufficient agreement between the two fill-level values L, a plausible fill-level value L or a functioning measuring device 1 can be concluded from this. This further increases the certainty of the fill-level measurement.

The invention claimed is:

1. A measuring system for measuring a fill level of a filling material in a container, comprising:

a radar-based measuring device, having:

a transmission unit via which radar signals can be transmitted in a direction of the filling material and, after reflection at a filling material surface, can be received as received signals, wherein the transmission unit includes a measuring probe that extends into the container;

a signal generation unit that is designed to generate the radar signals to be transmitted, wherein the radar signals are generated according to the time-domain reflectometry (TDR) method; and a receiving unit that is designed to record the received signals according to the TDR method; and an evaluation unit in which a machine learning algorithm is designed so as to detect the fill level on the basis of the received signals.

2. The measuring system according to claim 1, wherein the machine learning algorithm is designed as an artificial neural network.

3. The measuring system according to claim 1, wherein the evaluation unit is designed as an integral component of the measuring device.

4. The measuring system according to claim 1, wherein the evaluation unit is designed as a component of a higher-level network.

5. The measuring system according to claim 1, wherein the transmission unit is designed as an antenna.

6. A method for detecting a fill level of a filling material in a container, comprising:

providing a measuring system for measuring the fill level of the filling material in the container, including:

a radar-based measuring device, having:

a transmission unit via which radar signals can be transmitted in a direction of the filling material and, after reflection at a filling material surface, can be received as received signals, wherein the transmission unit includes a measuring probe that extends into the container;

a signal generation unit that is designed to generate the radar signals to be transmitted, wherein the radar signals are generated according to the time-domain reflectometry (TDR) method; and a receiving unit that is designed to record the received signals according to the TDR method; and an evaluation unit in which a machine learning algorithm is designed so as to detect the fill level on the basis of the received signal;

emitting the radar signals via the transmission unit into the container;

recording the received signals after reflection of the radar signals; and evaluating the received signals using the machine learning algorithm such that the fill level is detected.

7. The method according to claim 6, further comprising:

training the machine learning algorithm with experimentally-obtained received signals and/or simulation-generated received signals.

8. The method according to claim 6, further comprising:

determining a fill-level value by localizing a signal maximum corresponding to the filling material surface in the received signals;

comparing the fill-level value determined by localizing the corresponding signal maximum with the fill level determined by the machine learning algorithm; and classifying the determined fill level as plausible provided that the comparison results in a sufficient match.

9. The measuring system according to claim 1, wherein the evaluation unit is further configured to:

determine a fill-level value by localizing a signal maximum corresponding to the filling material surface in the received signals;

compare the fill-level value determined by localizing the corresponding signal maximum with the fill level determined by the machine learning algorithm; and classify the determined fill level as plausible provided that the comparison results in a sufficient match.

* * * * *